United States Patent [19]

Shimizu et al.

[11] Patent Number: 5,239,253
[45] Date of Patent: Aug. 24, 1993

[54] PORTABLE ENGINE GENERATOR

[75] Inventors: Motohiro Shimizu; Masashi Nakamura, both of Wako, Japan

[73] Assignee: Honda Giken Kogyo Kabushiki Kaisha, Tokyo, Japan

[21] Appl. No.: 813,344

[22] Filed: Dec. 24, 1991

[30] Foreign Application Priority Data

Dec. 27, 1990 [JP] Japan ................. 2-414927

[51] Int. Cl.$^5$ .............................. H02P 9/00
[52] U.S. Cl. ............................ 322/25; 322/28; 322/90
[58] Field of Search ............ 322/22, 23, 24, 25, 322/28, 90

[56] References Cited

U.S. PATENT DOCUMENTS

| | | | |
|---|---|---|---|
| 4,570,198 | 2/1986 | Storti et al. | 322/27 X |
| 4,629,966 | 12/1986 | Quantz | 322/25 |
| 4,642,548 | 2/1987 | Mashino | 322/25 |
| 4,797,800 | 1/1989 | Simizu | 322/1 X |
| 4,918,592 | 4/1990 | Shimizu | 322/28 X |
| 5,093,611 | 3/1992 | Nakamura et al. | 322/28 X |

FOREIGN PATENT DOCUMENTS

| | | |
|---|---|---|
| 59-132398 | 9/1984 | Japan . |
| 60-82098 | 5/1985 | Japan . |
| 63-114527 | 5/1988 | Japan . |
| 3-93499 | 4/1991 | Japan . |

Primary Examiner—Kristine L. Peckman
Attorney, Agent, or Firm—Frishauf, Holtz, Goodman & Woodward

[57] ABSTRACT

A portable engine generator includes an overcurrent detector which detects load current to determine whether the engine is in an overcurrent state. A voltage detector detects output voltage from the engine generator. A timer circuit starts to operate when the overcurrent state is detected by the overcurrent detector and continues to operate while the overcurrent state continues to be detected. The timer circuit starts to output a signal for interrupting the supply of output power when a predetermined time period has elapsed after the start of operation thereof. The predetermined time period is set to a shorter time period as the output voltage detected by the voltage detector assumes a lower value.

4 Claims, 5 Drawing Sheets

PORTABLE ENGINE GENERATOR

BACKGROUND OF THE INVENTION

1. Field of the Invention

This invention relates to a portable engine generator for use as a portable AC power unit.

2. Prior Art

In recent years, portable AC power units have been increasing in number which are equipped with invertor devices for stabilizing the output frequency. For example, a portable power unit which generates AC power having a commercial frequency by means of an AC generator driven by an engine is known, e.g. by Japanese Provisional Utility Model Publication (Kokai) No. 59-132398, in which the engine is operated within a high speed range to cause the AC generator to generate high AC output, the output is converted into direct current, then the direct current is converted into alternating current by an invertor device, and the alternating current is outputted.

In the meanwhile, there is a demand for AC power units of this kind whose output waveform is as close to a sine wave as possible dependent upon their application. To this end, an attempt has been made to employ an invertor device of the pulse width-modulation type as the above-mentioned invertor device (Japanese Provisional Patent Publication (Kokai) No. 60-82098).

In engine generators of this kind, there have been used various kinds of protective means for protection of the output circuit. However, depending on the output characteristics and load characteristics of the generator, there is the possibility that the amount of load current outputted from the generator does not directly represent the state of load, which has spoiled the perfectness of conventional protection systems using the amount of load current as a direct indicator of the state of load. For example, in the case of a protection system which is adapted to merely cut off the power output from the engine generator when the load current has increased above a critical level, if a load device, such as an electric motor, is connected to the output circuit of the generator, and into which a large amount of electric current temporarily flows when it is started, there is the possibility that the power cut-off is carried out to a greater extent or more frequently than required, at the start of the load device. Therefore, such a system does not form the optimum protection system for output circuit protection.

In view of these circumstances, the present assignee has already proposed, in Japanese Provisional Patent Publication (Kokai) No. 63-114527, a system for invertor-controlled type generators, which is capable of starting a load device such as an electric motor, by interrupting the power supply from the generator only over a predetermined time period when an overcurrent state is detected, and then resuming the power supply after the lapse of the predetermined time period, and thus repeating the interruption and resumption of the power supply. An engine generator incorporating this proposed system is capable of starting an electric motor etc. However, for circuit protection, the engine generator requires the use of a special protective system.

SUMMARY OF THE INVENTION

It is the object of the invention to provide a portable engine generator which is capable of easily starting even an electric motor and like load devices, by quickly interrupting the power supply when the load device is short-circuited, while retarding the interruption of the power supply if the output voltage from the generator is not very low even when an overcurrent state is detected.

To attain the above object, the invention provides a portable generator apparatus comprising: an output; an engine; a generator driven by the engine; overcurrent detecting means for detecting current flowing into a load connected to the output of the portable generator apparatus, to determine whether the portable generator apparatus is in an overcurrent state; voltage detecting means for detecting an output voltage from the output of the portable generator apparatus; and timer means which starts to operate when the overcurrent state is detected by the overcurrent detecting means and which continues to operate while the overcurrent state continues to be detected, the timer means starting to output a signal for interrupting a supply of output power from the output of the portable generator apparatus when a predetermined time period has elapsed after the start of operation thereof. The predetermined time period is set to be a shorter time period as the output voltage detected by the voltage detecting means assumes a lower value.

Preferably, a portable generator apparatus includes clock pulse-forming means connected to the timer means for forming clock pulses having a variable frequency and for supplying the clock pulses to the timer means. The overcurrent detecting means supplies an overcurrent detecting signal to the timer means when the overcurrent detecting means detects the overcurrent state, and the timer means starts to count the number of the clock pulses when the overcurrent detection signal starts to be supplied thereto, the timer means continuing to count the number of the clock pulses while the overcurrent detection signal continues to be supplied thereto, the timer means starting to output the signal for interrupting the supply of output power from the output of the portable generator apparatus when a predetermined number of the clock pulses has been counted, the clock pulse-forming means setting the variable frequency of the clock pulses to a higher value as the output voltage detected by the voltage detecting means is lower.

For example, a portable generator apparatus may further include:
 direct current power source means for rectifying an output from the generator apparatus into a direct current power;
 switching means for switching controlling an output from the direct current power source means for selectively turning the output on and off;
 sine wave-forming means for generating a sine wave reference signal having a predetermined frequency;
 pulse width modulating means for subjecting the sine wave reference signal to pulse width modulation to generate a pulse width modulated signal;
 switching control means for causing the switching means to switchingly control the output from the direct current power source means based on the pulse width modulated signal from the pulse width modulating means; and
 an output circuit connected to the switching means for generating an alternating current power output having a sinusoidal waveform;

and the clock pulse-forming means forms the clock pulses having the variable frequency based on the sine wave reference signal supplied from the sine wave-forming means.

Preferably, the clock pulse-forming means comprises pulse train-forming means for forming the sine wave reference signal into a pulse train, frequency divider means for frequency-dividing the pulse train into a plurality of clock pulse signals having different frequencies, and selecting means for selecting one of the plurality of clock pulse signals according to the output voltage detected by the voltage detecting means and for outputting the selected one of the plurality of clock pulse signals as the clock pulses.

The above and other objects, features, and advantages of the invention will become more apparent from the ensuing detailed description taken in conjunction with the accompanying drawings.

DETAILED DESCRIPTION

The invention will now be described in detail with reference to the drawings showing embodiments thereof.

Figure 1A:
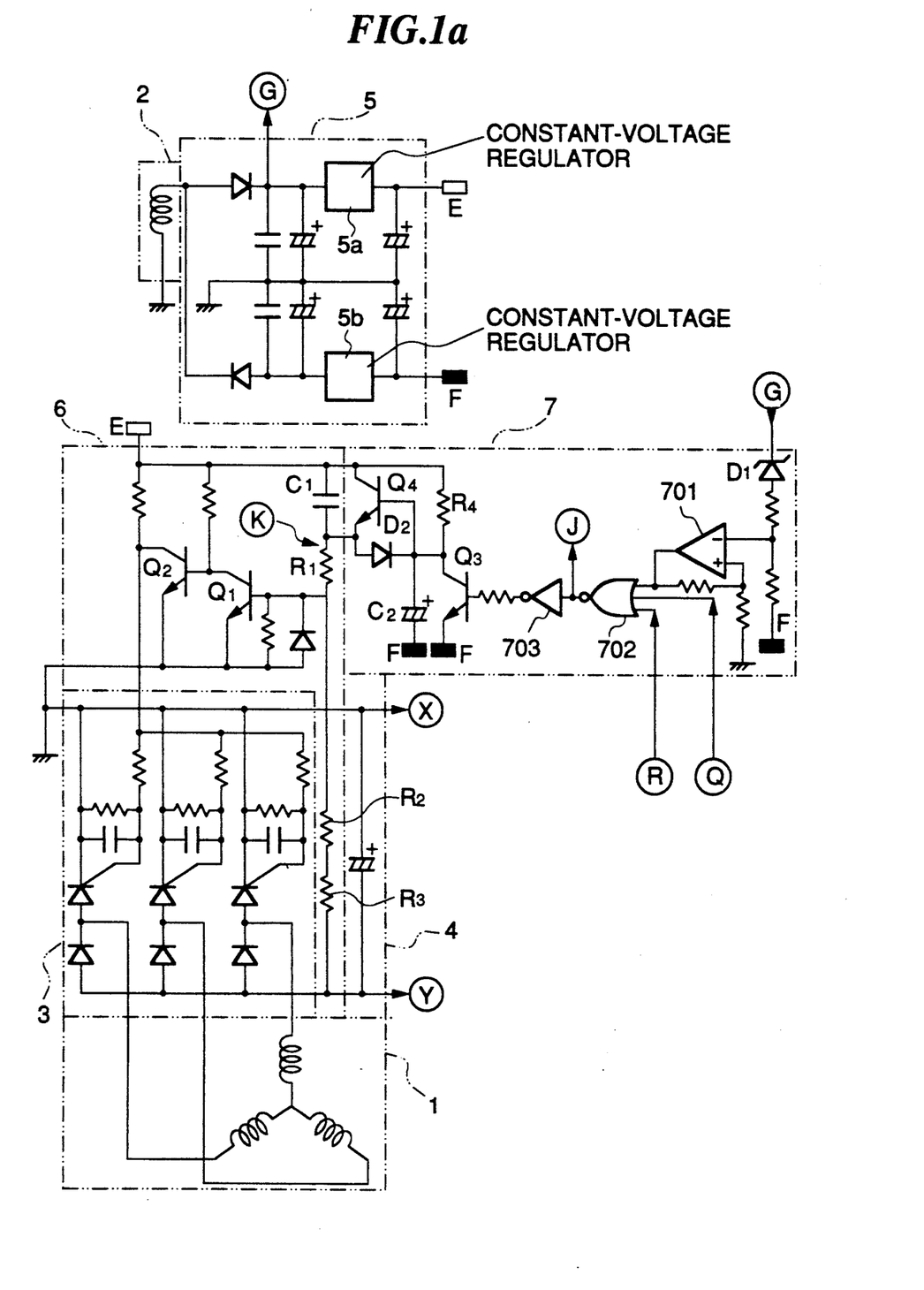
FIG. 1a is a circuit diagram showing a part of a portable engine generator according to an embodiment of the invention.

FIGS. 1a to 1e show the whole arrangement of a portable engine generator according to an embodiment of the invention. In FIG. 1a, reference numerals 1 and 2 designate respectively a three-phase output winding and a single-phase auxiliary winding wound on a common stator core, not shown, of an AC generator, separately from each other.

A magnet rotor, not shown, having a plurality of magnetic poles is arranged to be rotatively driven by an engine, not shown. The three-phase output winding 1 has its output connected to a bridge rectifier 3 comprised of three thyristors and three diodes, which in turn has its output connected to a smoothing circuit 4.

The single-phase auxiliary winding 2 has its output connected to a constant-voltage regulator circuit 5 having positive and negative output terminals E and F. The constant-voltage regulator circuit 5 has two sets of rectifiers, smoothing circuits, and constant-voltage regulators 5a, 5b, one set being operable in response to current flowing in one direction from the auxiliary winding 2, the other set in response to current flowing in the other direction from the winding 2 so that the output terminals E, F supply positive constant voltage and negative constant voltage, respectively.

Reference numeral 6 designates a thyristor control circuit which has a power source-input terminal connected to the positive output terminal E of the constant-voltage regulator circuit 5, and another terminal grounded together with a positive terminal of the smoothing circuit 4. The thyristor control circuit 6 has a signal-input terminal formed of a series circuit of a capacitor C1, and resistances R1 to R3. One end of the series circuit on the capacitor C1 side is connected to the positive output terminal E of the constant-voltage regulator circuit 5, while the other end of the series circuit on the resistance R3 side is connected to a negative terminal of the smoothing circuit 4. A junction between the resistances R1 and R2 is connected to a base of a transistor Q1, which has a collector connected to a base of a transistor Q2. The transistor Q2 in turn has a collector connected to gate input circuits of the thyristors of the bridge rectifier 3. The thyristor control circuit 6, which is arranged as above, controls input signals to the gate input circuits according to a potential at the junction between the resistances R1 and R2 (details of the thyristor control circuit 6 are disclosed in Japanese Provisional Patent Publication (Kokai) No. 3-93499 filed by the assignee, and therefore detailed description thereof is omitted here).

A junction K between the capacitor C1 and the resistance R1 is connected to the output of a transient inhibit circuit 7. The transient inhibit circuit 7 has a Zener diode D1, which has a cathode connected to an input terminal G of the constant-voltage regulator 5a provided on the positive output terminal E side of the constant-voltage regulator circuit 5, and an anode connected to the negative output terminal F of the constant-voltage regulator circuit 5 as well as to an inverting input terminal of an inverting comparator 701 formed of an operational amplifier, via resistances. The inverting comparator 701 has a non-inverting input terminal grounded via a resistance. The output of the inverting comparator 701 is connected to one input terminal of a NOR circuit 702, which has other input terminals supplied respectively with outputs from a timer circuit 30 and a stop command circuit 31, both referred to hereinafter. The output of the NOR circuit 702 is connected via an invertor 703 and a resistance to a base of a transistor Q3. The transistor Q3 has an emitter connected to the negative output terminal F of the constant-voltage regulator circuit 5, and a collector connected to the positive output terminal E of the constant-voltage regulator circuit 5 via a resistance R4 and to the negative output terminal F of the constant-voltage regulator circuit 5 via a capacitor C2. The capacitor C2 has a positive terminal connected to a base of a transistor Q4, which in turn has a collector connected to the positive output terminal E of the constant-voltage regulator circuit 5 and an emitter connected to an anode of a diode D2 and the junction K between the capacitor C1 and the resistance R1 of the thyristor control circuit 6. The diode D2 has a cathode connected to the positive terminal of the capacitor C2.

Figure 1B:
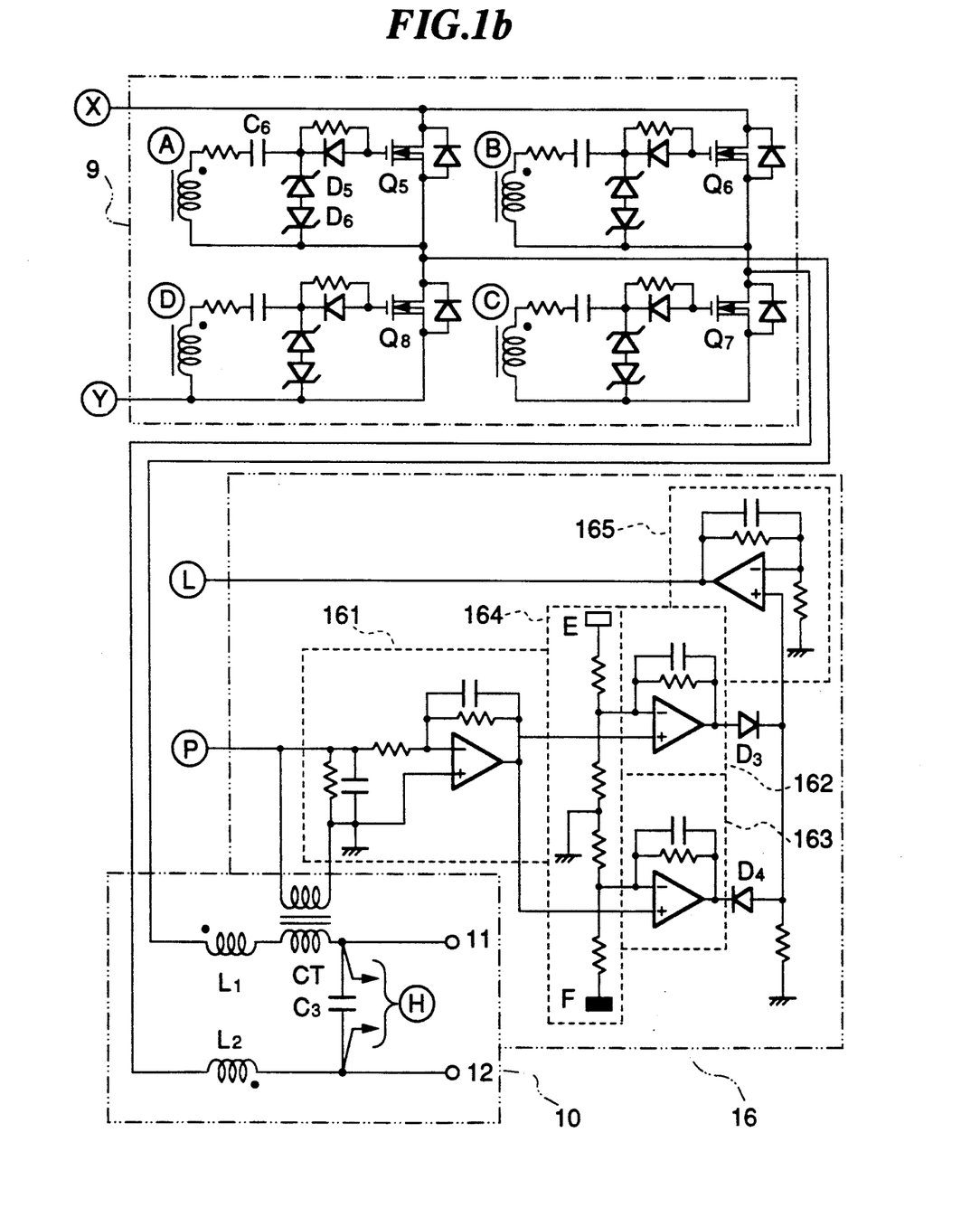
FIG. 1b is a circuit diagram showing another part of the engine generator.

The smoothing circuit 4 has its output connected to an invertor (switching means) 9 shown in FIG. 1b. The invertor 9 is formed by a bridge circuit composed of four FET's (field effect transistors) Q5–Q8 as switching elements which have their gates connected to FET gate-driving signal circuits 24, 25, hereinafter referred to.

The output of the invertor 9 is connected to output terminals 11 and 12 via an output circuit 10. A load, not shown, is to be connected to the output terminals 11, 12. The output circuit 10 comprises a low-pass filter formed of coils L1 and L2 connected in series to the load, and a capacitor C3 connected in parallel with the load, and a current transformer CT connected in series with the load between the coil L1 and the capacitor C3.

Figure 1C:
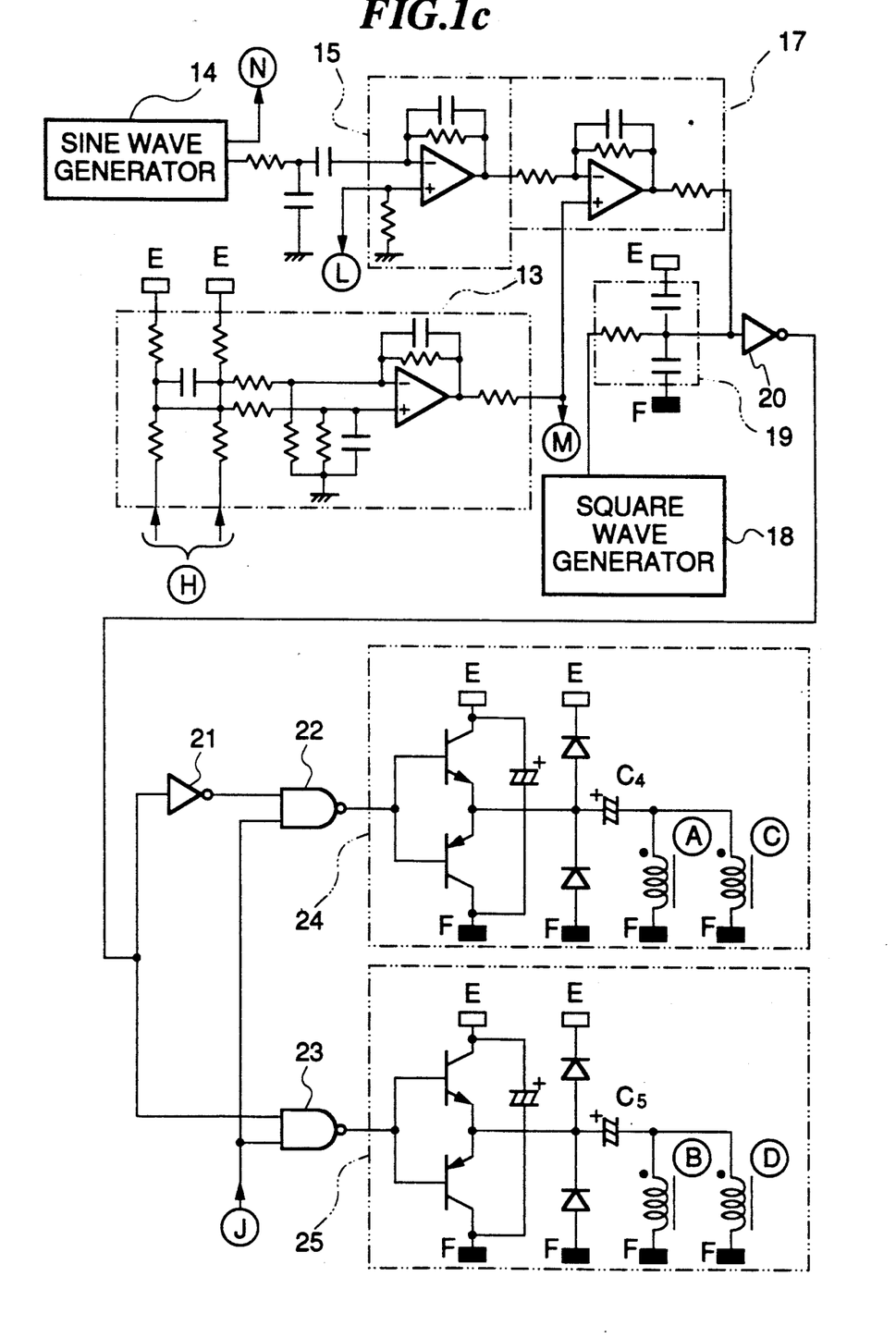
FIG. 1c is a circuit diagram showing a further part of the engine generator.

The output terminals 11, 12 (the opposite ends H of the capacitor C3 of the low-pass filter) are connected to a distortion-detecting circuit 13 formed of dividing resistances, a differential amplifier, etc, shown in FIG. 1c. The distortion-detecting circuit 13 directly compares between voltages appearing on the output terminals 11 and 12 to thereby detect distortions in the waveform of the engine generator output voltage and an offset component thereof and outputs a signal indicative of the results of the comparison.

In FIG. 1c, reference numeral 14 designates a sine wave generator which generates a sine wave signal having a commercial frequency, e.g. 50 Hz or 60 Hz. The output of the sine wave generator 14 is connected to an inverting input terminal of an operational amplifier of a differential amplifier 15 via a resistance, while the output of a peak-detecting circuit 16 (shown in FIG. 1b) is connected to a non-inverting input terminal of the operational amplifier of the differential amplifier 15.

The peak-detecting circuit 16 is connected to the secondary side of the current transformer CT, and comprises an inverting amplifier 161 which inversely amplifies a signal indicative of the AC output current detected via the current transformer CT, an upper and lower limit-setting circuit 164 for setting upper and lower limit voltage values, offset amplifiers 162, 163 for comparing the output from the inverting amplifier 161 with outputs from the upper and lower limit-setting circuit 164 and amplifying a portion of the output from the inverting amplifier 161 which is outside a reference amplitude range, and a non-inverting amplifier 165 which is supplied with outputs from the offset amplifiers 162, 163 via diodes D3, D4, respectively, the outputs from the offset amplifiers 162, 163 forming a composite signal, and amplifies the composite signal.

The differential amplifier 15 shown in FIG. 1c amplifies the difference between the sine wave output from the the sine wave generator 14 and the output from the peak-detecting circuit 16 to thereby correct the sine wave signal from the sine wave generator 14 by the signal supplied by the peak-detecting circuit 16 in a feedback manner responsive to the AC output current flowing through the output circuit 10.

The output of the differential amplifier 15 is connected to an inverting input terminal of an operational amplifier of a differential amplifier 17, while the output of the distortion-detecting circuit 13 is connected to a non-inverting input terminal of the operational amplifier of the differential amplifier 17. The differential amplifier 17 further corrects the level of the sine wave signal supplied from the differential amplifier 15 by the signal supplied from the peak-detecting circuit 13, and outputs a corrected sine wave signal.

Reference numeral 18 designates a square wave generator which generates a square wave signal having a frequency by far higher than the frequency of the sine wave signal generated by the sine wave generator 14. The output of the square wave generator 18 is connected to an integrating circuit 19, which integrates the square wave signal into a triangular wave signal.

The corrected sine wave signal from the differential amplifier 17 and the triangular wave signal from the integrating circuit 19 are superposed upon each other and the superposed signal is then supplied to an invertor buffer (pulse width modulating circuit) 20. The invertor buffer 20 is formed by an amplifier with a predetermined fixed threshold level which operates such that when a signal having a level exceeding the threshold level is inputted, it outputs an amplified low level signal, while when a signal having a level below the threshold value is inputted, it outputs an amplified high level signal, thus forming a pulse width modulated (PWM) signal. The invertor buffer 106 may be formed by an IC having a fixed threshold level relative to its gate input level, e.g. a threshold level of a CMOS gate on the input terminal side.

The output of the invertor buffer 20 is connected via an invertor 21 to an input terminal of a NAND circuit 22, and directly connected to an input terminal of a NAND circuit 23. The other input terminals of the NAND circuits 22, 23 are connected to the output J of the NOR circuit 702 of the transient inhibit circuit 7.

Figure 1D:
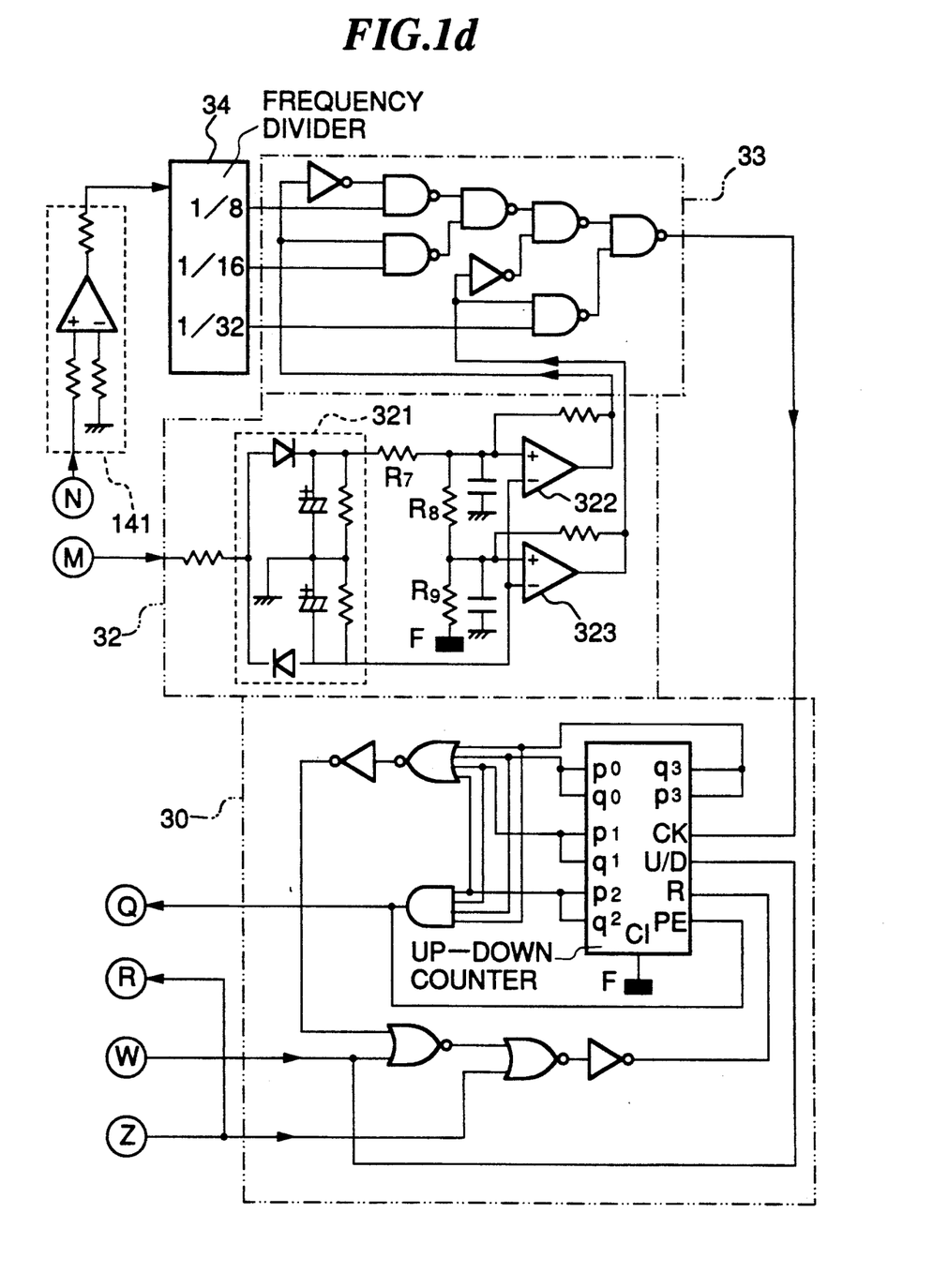
FIG. 1d is a circuit diagram showing a part of an excessive load detecting circuit, forming the gist of the invention, which is incorporated in the engine generator.
Figure 1E:
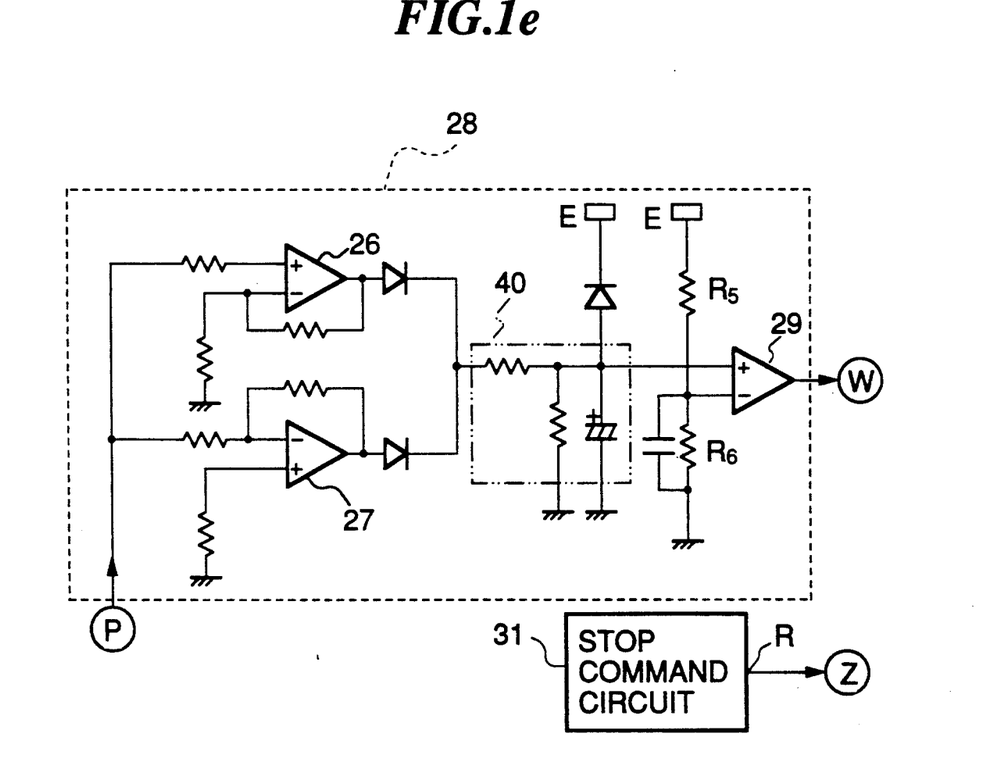
FIG. 1e is a circuit diagram showing another part of the excessive load detecting circuit.

The outputs of the NAND circuits 22, 23 in FIG. 1e are connected to the FET gate-driving signal circuits 24, 25. The FET gate-driving signal circuit 24 is comprised of a push-pull amplifier, diodes for absorbing surge, a capacitor C4 for eliminating low frequency components, and primary coils of pulse transformers A, C. Similarly, the gate-driving signal circuit 25 is comprised of a push-pull amplifier, diodes for absorbing surge, a capacitor C5 for eliminating low frequency components, and primary coils of pulse transformers B, D.

The secondary coil of the pulse transformer A (appearing in the invertor 9 in FIG. 1b) is connected to a gate of the FET Q5 via a damping resistance, a capacitor C6 for reproducing the pulse width modulated signal, and a two-way voltage limiter formed of diodes D5, D6. The secondary coils of the pulse transformers B, C, D are connected to gates of the FET's Q6, Q7, Q8, respectively, via circuits each of which is identical to the one described hereinbefore in relation to the secondary coil of the pulse transformer A.

Next, an excessive load-detecting circuit will be described with reference to FIGS. 1d and 1e.

One end P of the secondary side of the current transformer CT of the output circuit 10 is connected to an overcurrent-detecting circuit 28 in FIG. 1e. The overcurrent-detecting circuit 28 is comprised of operational amplifiers 26, 27, 29, and resistances R5, R6. The one end P of the secondary side of the current transformer CT is connected via a resistance to a non-inverting input terminal of the operational amplifier 26, and also via a resistance to an inverting input terminal of the operational amplifier 27. An inverting input terminal of the operational amplifier 26 and a non-inverting input terminal of the operational amplifier 27 are grounded via respective resistances. An output terminal of the operational amplifier 26 and an output terminal of the operational amplifier 27 are connected via respective diodes to each other, and then connected to an integrating circuit 40. The operational amplifier 26 selectively amplifies a positive portion of the signal supplied from the current transformer CT, while the operational amplifier 27 selectively inversely amplifies a negative portion of same. The amplified signal portions are superposed upon each other, and then smoothed by the integrating circuit 40.

The smoothed output from the integrating circuit 40 is supplied to a non-inverting input terminal of the operational amplifier 29. A predetermined reference voltage from a junction of resistances R5 and R6 obtained by dividing the difference in potential between the positive output terminal E of the constant-voltage regulator circuit 5 and ground by the resistances R5 and R6 is supplied to an inverting input terminal of the operational amplifier 29. The output of the operational amplifier 29 is connected to a count-starting terminal of the timer circuit 30 in FIG. 1d. The timer circuit 30 has a count-stopping terminal thereof supplied with the output from the stop command circuit 31. As the timer circuit 30, there may be used, for example, and up-down counter "4516" for general purposes having CMOS gates. While a high level signal is supplied to the count-starting terminal U/D, the timer circuit 30 counts the number of clock pulses supplied to a clock pulse terminal CK thereof. When the count reaches a predetermined value, the timer counter 30 outputs a high level signal from an output terminal Q thereof. The stop command circuit 31 supplies a high level signal in response to the operator's manual operation to stop the power supply from the portable engine generator or to an optional function exhibited in relation to stoppage of the engine generator. This high level signal from the stop command circuit 31 causes the timer circuit 30 to stop counting the number of clock pulses supplied thereto.

The output terminal Q of the timer circuit 30 is connected to one of the input terminals of the NOR circuit 702, and an output terminal R of the stop command circuit 31 is also connected to another one of the input terminals of the NOR circuit 702.

Further, an output terminal M of the distortion-detecting circuit 13 is connected to a voltage-determining circuit 32 in FIG. 1d. The voltage-determining circuit 32 has output terminals thereof connected to input terminals of a clock pulse-generating circuit 33. The clock pulse-generating circuit 33 has other input terminals thereof connected to an output terminal N of the sine wave generator 14 via a pulse train-forming circuit 141 and a frequency divider 34. An output from the clock pulse-generating circuit 33 is supplied to the clock pulse terminal CK of the timer circuit 30.

According to the voltage-determining circuit 32, an input signal from the distortion-detecting circuit 13 is subjected to full-wave voltage-doubling rectification in a rectifier/smoothing circuit 321. A negative output from the rectifier/smoothing circuit 321 is supplied to inverting input terminals of operational amplifiers 322 and 323, while a positive output from the rectifier/smoothing circuit 321 is divided by resistances R7, R8, and R9, and the resulting divided voltages are supplied to noninverting input terminals of the operational amplifiers 322 and 323, respectively. The resistance values of the resistances R7, R8, and R9 are set, for example, such that when the output voltage from the output circuit 10 assumes a value of 67 V or higher, the operational amplifiers 322 and 323 both output high level signals, while when it assumes a value of 33 V or higher but lower than 67 V, the operational amplifier 322 outputs a high level signal and the operational amplifier 323 outputs a low level signal, and when it assumes a value lower than 33 V, the operational amplifiers 322 and 323 both output low level signals.

The sine wave signal having the predetermined frequency supplied from the sine wave generator 14 is formed into a pulse train signal by the pulse train-forming circuit 141, and then supplied to the frequency divider 34, where the pulse train signal is frequency-divided into a pulse train having a frequency of ⅛ the input pulse train signal frequency, a pulse train having a frequency of 1/16 the same, and a pulse train having a frequency of 1/32 the same. These pulse trains are supplied to the clock pulse-generating circuit 33. The clock pulse-generating circuit 33 selects one of the pulse trains obtained by frequency dividing according to the output signals from the operational amplifiers 322 and 323 of the voltage-determining circuit 32 (when the engine generator output voltage is equal to or higher than 67 V and hence the operational amplifiers 322 and 323 both output high level signals, it selects the pulse train having the 1/32 frequency; when the engine generator output voltage is within a range of 67 to 33 V and hence the operational amplifier 322 alone outputs a high level signal, it selects the pulse train having the 1/16 frequency; and when the engine generator output voltage is lower than 33 V and hence the operational amplifiers 322 and 323 both output low level signals, it selects the pulse train having the ⅛ frequency). Clock pulses of the selected pulse train are supplied to the timer circuit 30. The timer circuit 30 sets a time period between the time point the counting is started and the time point the count reaches a predetermined value and the timer circuit 30 starts to output a high level signal, e.g. to 10 seconds when the timer circuit 30 is supplied with clock pulses of the pulse train having the 1/32 frequency, to 5 seconds when it is supplied with clock pulses of the pulse train having the 1/16 frequency, and to 2.5 seconds when it is supplied with clock pulses of the pulse train having the ⅛ frequency.

Next, the operation of the portable engine generator constructed as above will be described.

As the engine generator is driven by the engine, the three-phase output winding 1 generates three-phase AC power which is rectified by the bridge rectifier 3, and then smoothed into DC power by the smoothing circuit 4, while variation in the DC voltage in the smoothing circuit 4 is detected via the resistances R2, R3 by the thyristor control circuit 6, which supplies a signal indicative of the results of the detection to the thyristors of the bridge rectifier 3 to thereby effect on/off control of the thyristors, such that the output voltage from the smoothing circuit 4 is stably kept at a predetermined DC voltage in a feedback manner. In this connection, the thyristor control circuit 6 is also supplied with an output signal from the transient inhibit circuit 7. The operation of the thyristor control circuit 6 and the bridge rectifier 3 responsive to the signal will be described later.

The FET's Q5, Q7 and FET's Q6, Q8 of the invertor 9 have their gates supplied with the pulse width-modulated (PWM) signal so that the FET's Q5, Q7 are caused to conduct alternately, and so do the FET's Q6, Q8 to effect switching control of the DC output from the smoothing circuit 4. The switch-controlled output is supplied to the output circuit 10 where high requency components thereof are removed. The output from the output circuit 10 is supplied through the output terminals 11, 12 to the load as commercial frequency AC power.

A waveform of the output voltage appearing at the output terminal 11 and a waveform of the output voltage appearing at the output terminal 12 are compared with each other by the distortion-detecting circuit 13 to detect the difference therebetween, i.e. a distortion in the waveform of the engine generator output voltage or an offset component of same, and a signal indicative of the difference is supplied to the differential amplifier 17.

In the meanwhile, the AC output current is detected via the current transformer CT of the output circuit 10. A signal indicative of the detected AC output current is inversely amplified by the inverting amplifier 161 of the peak-detecting circuit 16 and then supplied to the offset amplifiers 162, 163. The offset amplifier 162 compares the amplitude of the output from the inverting amplifier 161 with the predetermined upper limit voltage supplied from the upper and lower limit-setting circuit 164 to the inverting input terminal of same, and amplifies only a portion (a peak portion in a positive half-cycle) of the voltage of the signal exceeding the predetermined upper limit voltage. The offset amplifier 163 compares the amplitude of the output from the inverting amplifier 161 with the predetermined lower limit voltage supplied from the upper and lower limit-setting circuit 164 to the inverting input terminal of same, and amplifies only a portion (a peak portion in a negative half-cycle) of the voltage of the signal lower than the predetermined lower limit voltage. The outputs from the offset amplifiers 162, 163 pass the diodes D3, D4, respectively, and are then superposed on each other. The superposed signal is a composite signal of a volatage portion of the amplified signal which is higher in voltage than the predetermined upper limit voltage and a voltage portion of the amplified signal which is lower in voltage than the predetermined lower limit voltage. When the amplified signal is neither higher than the upper limit voltage nor lower than the lower limit voltage, the composite signal is held at a zero level.

The composite signal is amplified by the non-inverting amplifier 165, and then supplied to the non-inverting input terminal of the operational amplifier of the differential amplifier 15. The differential amplifier 15 compares the composite signal with the sine wave signal from the sine wave generator 14, and performs differential amplification, i.e. amplifies the difference between the two signals. More specifically, when the AC output current becomes so large that the level of a peak portion in a positive or negative half-cycle of the commercial frequency signal falls above or below the predetermined upper or lower limit voltage, i.e. portions of the waveform of the AC output current falls outside the range determined by the predetermined upper and lower limits of amplitude, the sine wave signal is corrected in a feedback manner responsive to the amount of the peak portion above or below the predetermined upper or lower limit such that the peak portion of the sine wave signal is made flat. The sine wave signal which is thus corrected with respect to its peak portions is then supplied to the differential amplifier 17.

The differential amplifier 17 compares the corrected sine wave signal from the differential amplifier 15 with the feedback signal from the distortion-detecting circuit 13 containing distortions in the waveform of the output voltage and DC offset components of same, and corrects the level of the former by the latter, to output a twice-corrected sine wave signal.

The square wave signal from the square wave generator 18 is integrated by the integrating circuit 19 into the triangular wave signal. This triangular wave signal is superposed upon the corrected sine wave signal from the differential amplifier 17 into a superposed signal, which is supplied to the invertor buffer 20. The invertor buffer 20 operates to generate a low level output when supplied with an input having a level exceeding its threshold level, and generate a high level output when supplied with an input having a level below the threshold level. The resulting pulse train signal outputted from the invertor buffer 20 is the pulse width-modulated (PWM) signal obtained by pulse width modulating the corrected sine wave signal by the triangular signal as the carrier wave. Since the PWM signal is created by the use of the corrected sine wave signal, the AC output current is corrected with respect to its peak value as well as the AC output voltage can be corrected such that distortions in the waveform thereof and offset components are reduced. Further, the use of the invertor buffer having a response time (approx. 50 nsec.) by far shorter than that (approx. 1 μsec.) of a comparator used in conventional PWM type invertor devices enables increasing the frequency of a carrier wave used for forming the PWM signal, which enables to supply AC power having high quality which has an output waveform closer to the waveform of a sine wave.

The PWM signal from the invertor buffer 20 is, on one hand, inverted by the invertor 21 and then supplied to the NAND circuit 22, while on the other hand it is directly supplied to the NAND circuit 23. The NAND circuits 22, 23 are supplied with a low level signal from the transient inhibit circuit 7, when a state of the engine generator necessitating the circuit protection, such as an overcurrent state of same, is detected, or a low engine rotational speed, which will occur when the engine starts or on other occasions, is detected. In such a case, the NAND circuits 22, 23 continue to output high level signals irrespective of the pulse level of the PWM signal, thus the PWM signal is prevented from being transmitted to the invertor 9. When neither an excessive load on the engine generator, referred to hereinafter, nor a low engine rotational speed is detected, the NAND circuits 22, 23 are supplied with a high level signal from the transient inhibit circuit 7. In such a case, the NAND circuits 22, 23 are responsive to inverted and non-inverted PWM signals supplied thereto to output signals obtained by inverting the inverted and non-inverted PWM signals, respectively. Accordingly, the FET gate-driving signal circuit 24 is supplied with the non-inverted PWM signal, while the FET gate-driving signal circuit 25 is supplied with the inverted PWM signal.

In the FET gate-driving signal circuit 24, the PWM signal is subjected to push-pull amplification, and has its low frequency components, i.e. commercial frequency components, cut off by the capacitor C4. Before passing the capacitor C4, the PWM signal has constant amplitude with respect to the reference level but the average voltage (integrated value) of this signal varies with the same period as the sine wave signal from the sine wave generator 14. Therefore, this PWM signal contains a component of the same frequency as that of the sine wave signal (commercial frequency). The PWM signal is converted by the capacitor C4 into a pulse train which varies as a whole in reverse phase to the commercial frequency component and always has a zero average voltage.

This pulse train always having a zero average voltage is applied to the primary coils of the pulse transformers A, C. Therefore, cores of the pulse transformers A, C are almost not magnetically saturated due to the commercial frequency component, making it possible to use small-sized transformers A, C without the fear of being magnetically saturated at the PWM carrier frequency.

The FET gate-driving signal circuit 25 operates just similarly to the FET gate-driving circuit 24.

An output pulse signal from the secondary coil of the pulse transformer A is compared with the breakdown voltage of each of the Zener diodes D5, D6 forming the two-way voltage limiter. The capacitor C6 is charged or discharged by voltage portions of the pulse signal exceeding the corresponding breakdown voltages, so that a voltage occurs across the capacitor C6, which is an average voltage of the amounts by which the output pulse signal exceeds the breakdown voltages of the Zener diodes D5, D6, the average voltage having the commercial frequency. Therefore, a signal which is obtained by superposition of the terminal voltage of the capacitor C6 having the commercial frequency and the output pulse signal from the secondary coil of the pulse transformer A, i.e. the PWM signal before passing the capacitor C4, is reproduced between the gate and source of the FET Q5. The FET Q5 conducts while each positive pulse of the PWM signal is applied to its gate.

An output pulse signal from the secondary coil of the pulse transformer C is also processed in the same manner as the output pulse signal from the pulse transformer A. Thus, the FET's Q5 and Q7 conduct simultaneously.

Output pulse signals from the secondary coils of the pulse transformers B, D are processed in the same manner as the output pulse signals from the secondary coils of the pulse transformers A, C. However, since the PWM signal supplied to the pulse transformers A, C and the PWM signal supplied to the pulse transformers B, D are reverse in phase to each other, the FET's Q6, Q8 do not conduct when the FET's Q5, Q7 conduct, and the FET's Q5, Q7 do not conduct when the FET's Q6, Q8 conduct.

As described above, the invertor 9 carries out switching control based upon a PWM signal which is formed by modulating by a high frequency triangular wave signal a sine wave signal having a commercial frequency which is corrected in a feedback manner based on the output waveform, and then a carrier frequency component contained in the switched output from the invertor 7 is removed by the output circuit 10, whereby alternating current output having the commercial frequency, which is close in waveform to the sine wave signal, is supplied through the output terminals 11, 12 to the load.

For further details of the construction and operation of the circuit arrangement of the invertor 9 and the distortion-detecting circuit 13 through the FET gate-driving signal circuit 25 (except the differential amplifier 15 and the peak-detecting circuit 16), reference should be made to U.S. Ser. No. 07/790,470 filed Nov. 12, 1991, assigned to the assignee.

Next, the operation of the transient inhibit circuit 7 will be described.

Immediately after the engine is started, the output voltage of the AC generator is low, so that the voltage at the input terminal of the constant-voltage regulator 5a forming part of the constant-voltage regulator circuit 5 is low. Therefore, at the start of the engine, the voltage at the input terminal of the constant-voltage regulator 5a does not exceed the breakdown voltage of the Zener diode D1 (voltage corresponding to a predetermined engine rotational speed which is lower than the engine rotational speed to be assumed during normal operation of the engine generator), which prevents the Zener diode D1 from conducting. Accordingly, the potential at the inverting input terminal of the inverting comparator 701 remains at a low level, and therefore the inverting comparator 701 outputs a high level signal.

Since the NOR circuit 702 outputs a low level signal when it is supplied with a high level signal via at least one of its input terminals, the output from the NOR circuit 702 is low when any one of the outputs from the inverting comparator 701, the timer circuit 30, and the stop command circuit 31 is high.

The low level signal from the NOR circuit 702 is inverted by the invertor 703 into a high level signal, which causes the transistor Q3 to conduct, thereby allowing the capacitor C2 to be discharged. Accordingly, the transistor Q4 turns off, which results in a low level of potential at the junction K between the capacitor C1 and the resistance R1.

As a result, the transistor Q1 of the thyristor control circuit 6 remains off to cause the transistor Q2 to conduct, so that the gates of the thyristors of the bridge rectifier 3 are supplied with a low level signal. This prevents the thyristors from conducting and hence the bridge rectifier 3 does not supply a rectified output. In short, when the engine rotational speed is lower than a predetermined value, or when an excessive load on the engine generator is detected, the bridge rectifier 3 is inhibited from supplying the rectified output, whereby an unstable operation of the invertor device at the start of the engine as well as the power supply at the time a state of the engine generator necessitating the circuit protection, such as overcurrent due to excessive load, is prevented.

Then, when the output voltage from the AC generator gradually increases after the start of the engine, which causes the voltage at the input terminal of the constant-voltage regulator 5a to rise to a level exceeding the breakdown voltage of the Zener diode D1, that is, when the engine rotational speed exceeds the predetermined value, the Zener diode D1 conducts to convert the voltage supplied to the inverting input terminal of the inverting comparator 701 into a high level, and hence the inverting comparator 701 outputs a low level signal.

At this time, if a high level signal is neither supplied from the timer circuit 30 nor from the stop command circuit 31, the output from the NOR circuit 702 goes high, and hence the output from the invertor 703 goes low. Accordingly, the transistor Q3 turns off to cause the capacitor C2 to be charged by way of the resistance R4. As the capacitor C2 is thus charged, the potential at the positive terminal of the capacitor C2 gradually rises in accordance with a time constant determined by the capacity of the capacitor C2 and the resistance value of the resistance R4. Responsive to a rise in the potential at the positive terminal of the capacitor C2, the transistor Q4 conducts, which causes a potential at the emitter of the transistor Q4 to rise. However, if the potential at the emitter of the transistor Q4 becomes higher than a potential at the base of the transistor Q4, the transistor Q4 turns off. As a result, the potential at the junction K between the capacitor C1 and the resistance R1 is constantly held at a value slightly lower than the potential at the positive terminal of the capacitor C2. Therefore, the potential at the junction K gradually rises in accordance with the time constant determined by the capacity of the capacitor C2 and the resistance value of the resistance R4, after the engine rotational speed has exceeded the predetermined value.

The thyristor control voltage (between X and Y), which is proportional to the potential at the junction K, gradually rises. Finally, the potential at the junction K substantially reaches the positive output potential of the constant-voltage regulator circuit 5, and the gate voltage at the thyristors reaches a predetermined input value for feedback control carried out for maintaining a potential at the junction between the resistances R1 and R2 at a predetermined level.

Thus, even if the engine is started with the output terminals 11, 12 connected to a load, it is possible to prevent electric current from rushing into the thyristors of the bridge rectifier 3. At the same time, the gate voltage applied to the thyristors of the bridge rectifier 3 is controlled such that it gradually rises, whereby the DC output from the smoothing circuit 4 gradually rises after the start of the engine, which prevents application of a drastically-changing voltage to the FET's of the bridge invertor 9. The effects of this preventive operation are greater as the load connected to the output terminals 11, 12 at the start of the engine is heavier. Particularly when the load is short-circuited, adverse effects on the thyristors and the FET's are very effectively prevented.

Next, the operation of the excessive load-detecting circuit (FIGS. 1d and 1e) will be described.

First, load current is detected via the current transformer CT. The signal (voltage) indicative of the detected load current is subjected to full-wave rectification by the operational amplifiers 26, 27 of the overcurrent-detecting circuit 28, and then smoothed. The operational amplifier 29 compares the resulting signal with the reference voltage supplied thereto. Consequently, when the load current is larger than a predetermined value, i.e. when overcurrent flows, the operational amplifier 29 outputs a high level signal, which causes the timer circuit 30 to start counting the number of clock pulses supplied thereto.

On the other hand, in the voltage-determining circuit 32, the rectifier/smoothing circuit 321 subjects the output from the distortion-detecting circuit 13, i.e. an AC signal containing distortions in the waveform or offset components of the output voltage from the output circuit 10, to full-wave voltage-doubling rectification and smoothing, and the voltage of the resulting signal is compared with two different reference voltages at the operational amplifiers 322, 323. When the engine generator output voltage is equal to or higher than 67 V, the operational amplifiers 322 and 323 both output high level signals; when the engine generator output voltage is equal to or higher than 33 V but lower than 67 V, the operational amplifier 322 outputs a high level signal and the operational amplifier 323 outputs a low level signal; and when the engine generator output voltage is lower than 33 V, the operational amplifiers 322 and 323 both output low level signals. The clock pulse-generating circuit 33 selects one of the pulse trains obtained by the frequency divider 34 according to output signals from the operational amplifiers 322 and 323 of the voltage-determining circuit 32. More specifically, when the generator output voltage is equal to or higher than 67 V and hence the operational amplifiers 322 and 323 both output high level signals, the pulse train having the 1/32 frequency is selected; when the engine generator output voltage is within a range of 33 to 67 V and hence the operational amplifier 32 alone outputs a high level signal, the pulse train having the 1/16 frequency is selected; and when the engine generator output voltage is lower than 33 V and hence the operational amplifiers 322 and 323 both output low level signals, the pulse train having the ⅛ frequency is selected. Clock pulses of the selected frequency are supplied to the timer circuit 30.

When the load current is equal to or lower than the predetermined value, i.e. when the engine generator is in a normal operating condition in which no overcurrent flows, the output from the overcurrent-detecting circuit 28 (the operational amplifier 29) is held at a low level, and hence the level of a signal applied to a resetting terminal R of the timer circuit 30 is high, so that counting of clock pulses is inhibited even if they are supplied to the timer circuit 30.

Then, when the output from the overcurrent-detecting circuit 28 (the operational amplifier 29) goes high due to occurrence of an overcurrent state of the engine generator, the level of the signal applied to the resetting terminal R of the timer circuit 30 goes low to cancel the reset state of the timer circuit 30, to cause the timer circuit 30 to start counting of clock pulses.

The timer circuit 30 counts the number of clock pulses supplied from the clock pulse-generating circuit 33. When the count reaches a predetermined value, the timer circuit 30 starts to supply a high level signal to the NOR circuit 702 of the transient inhibit circuit 7. This high level signal inhibits the bridge rectifier 3 and the invertor 9 from operating, as described hereinbefore.

Further, once the count has reached the predetermined value, thereafter the timer circuit 30 continues to generate a high level output signal via its output terminal, unless a resetting signal (high level signal) is applied to the resetting terminal R of the timer circuit 30 by some resetting means, not shown, which is responsive e.g. to operation of a resetting switch or stoppage of operation of the engine generator, thus inhibiting the bridge rectifier circuit 3 and the inverter 9 from operating.

In addition, if an overcurrent state of the engine generator is eliminated during counting of clock pulses by the counter circuit 30 so that the output from the overcurrent-detecting circuit 28 goes low, a high level signal is applied to the resetting terminal R of the timer circuit 30 to reset same.

The timer circuit 30 starts to output a high level signal according to the engine generator output voltage, e.g. in the following manner: When the output voltage is equal to or higher than 67 V, the timer circuit 30 starts to output a high level signal when 10 seconds have elapsed after an overcurrent state of the engine generator started to be detected, if it has continued to be detected. Similarly, when the output voltage is equal to or higher than 33 V but lower than 67 V, it starts to output a high level signal when 5 seconds have elapsed after an overcurrent state of the engine generator started to be detected, if it has continued to be detected, and when the output voltage is lower than 33 V, it starts to output a high level signal when 2.5 seconds have elapsed after an overcurrent state of the engine generator started to be detected, if it has continued to be detected.

In addition, when the stop command circuit 31 outputs a high level signal, the timer circuit 30 stops counting the number of clock pulses in response to the high level signal inputted thereto, and at the same time, the high level signal is supplied to the NOR circuit 702 of the transient inhibit circuit 7, to cause same to stop the operations of the bridge rectifier circuit 3 and the inverter 9.

As described above, according to the invention, when an overcurrent state of the engine generator is detected, the cut-off of the power supply is not effected in a uniform manner, but in a manner dependent upon the engine generator output, such that as the engine generator output voltage is higher, i.e. the degree of overload is smaller, the power supply is interrupted after a longer waiting time period has elapsed. This is advantageous particularly for a portable generator having not a large capacity, such as a portable engine generator, in which the output voltage more faithfully reflects the degree of overload than in other large-capacity generators, since the power supply can be properly cut off according to the magnitude of load when an overcurrent state of the engine is detected. Therefore, it is possible to avoid power cut-off from taking place to an excessive degree e.g. when a temporary overcurrent state is detected due to a change in the load. Further, even if a load into which a large amount of current temporarily flows when started, such as an electric motor, is connected to the generator, the load can be smoothly started without causing interruption of the power supply.

What is claimed is:

1. A portable generator apparatus comprising:
   an output;
   an engine;
   a generator driven by said engine;
   overcurrent detecting means for detecting current flowing into a load connected to said output of said portable generator apparatus, to determine whether said portable generator apparatus is in an overcurrent state;
   voltage detecting means for detecting an output voltage from said output of said portable generator apparatus; and
   timer means which starts to operate when said overcurrent state is detected by said overcurrent detecting means and which continues to operate while said overcurrent state continues to be detected, said timer means starting to output a signal for interrupting a supply of output power from said output of said portable generator apparatus when a predetermined time period has elapsed after the start of operation thereof;
   wherein said predetermined time period is set to be a shorter time period as said output voltage detected by said voltage detecting means assumes a lower value.

2. A portable generator apparatus according to claim 1, further comprising:
   clock pulse-forming means connected to said timer means for forming clock pulses having a variable frequency and for supplying said clock pulses to said timer means;
   said overcurrent detecting means supplying an overcurrent detection signal to said timer means when said overcurrent detecting means detects said overcurrent state; and
   wherein said timer means starts to count the number of said clock pulses when said overcurrent detection signal starts to be supplied thereto, said timer means continuing to count the number of said clock pulses while said overcurrent detection signal continues to be supplied thereto, and
   said timer means starting to output said signal for interrupting the supply of output power from said output of said portable generator apparatus when a predetermined number of said clock pulses has been counted; and
   said clock pulse-forming means setting said variable frequency of said clock pulses to a higher value as said output voltage detected by said voltage detecting means is lower.

3. A portable generator apparatus according to claim 2, further comprising:
   direct current power source means for rectifying a power output from said generator apparatus into a direct current power;
   switching means for switchingly controlling an output from said direct current power source means to selectively turn said output from said direct current power source means on and off;
   sine wave-forming means for generating a sine wave reference signal having a predetermined frequency;
   pulse width modulating means for subjecting said sine wave reference signal to pulse width modulation to generate a pulse width modulated signal;
   switching control means for causing said switching means to switchingly control said output from said direct current power source means based on said pulse width modulated signal from said pulse width modulating means; and
   an output circuit connected to said switching means for generating an alternating current power output having a sinusoidal waveform;
   wherein said clock pulse-forming means forms said clock pulses having said variable frequency based on said sine wave reference signal supplied from said sine wave-forming means.

4. A portable generator apparatus according to claim 3, wherein said clock pulse-forming means comprises:
   pulse train-forming means for forming said sine wave reference signal into a pulse train;
   frequency divider means for frequency-dividing said pulse train into a plurality of clock pulse signals having different frequencies; and
   selecting means for selecting one of said plurality of clock pulse signals according to said output voltage detected by said voltage detecting means and for outputting said selected one of said plurality of clock pulse signals as said clock pulses.

* * * * *